Nov. 17, 1953
N. E. ANDERSON ET AL
2,659,797
ARC WELDING APPARATUS
Filed March 1, 1951
3 Sheets-Sheet 1
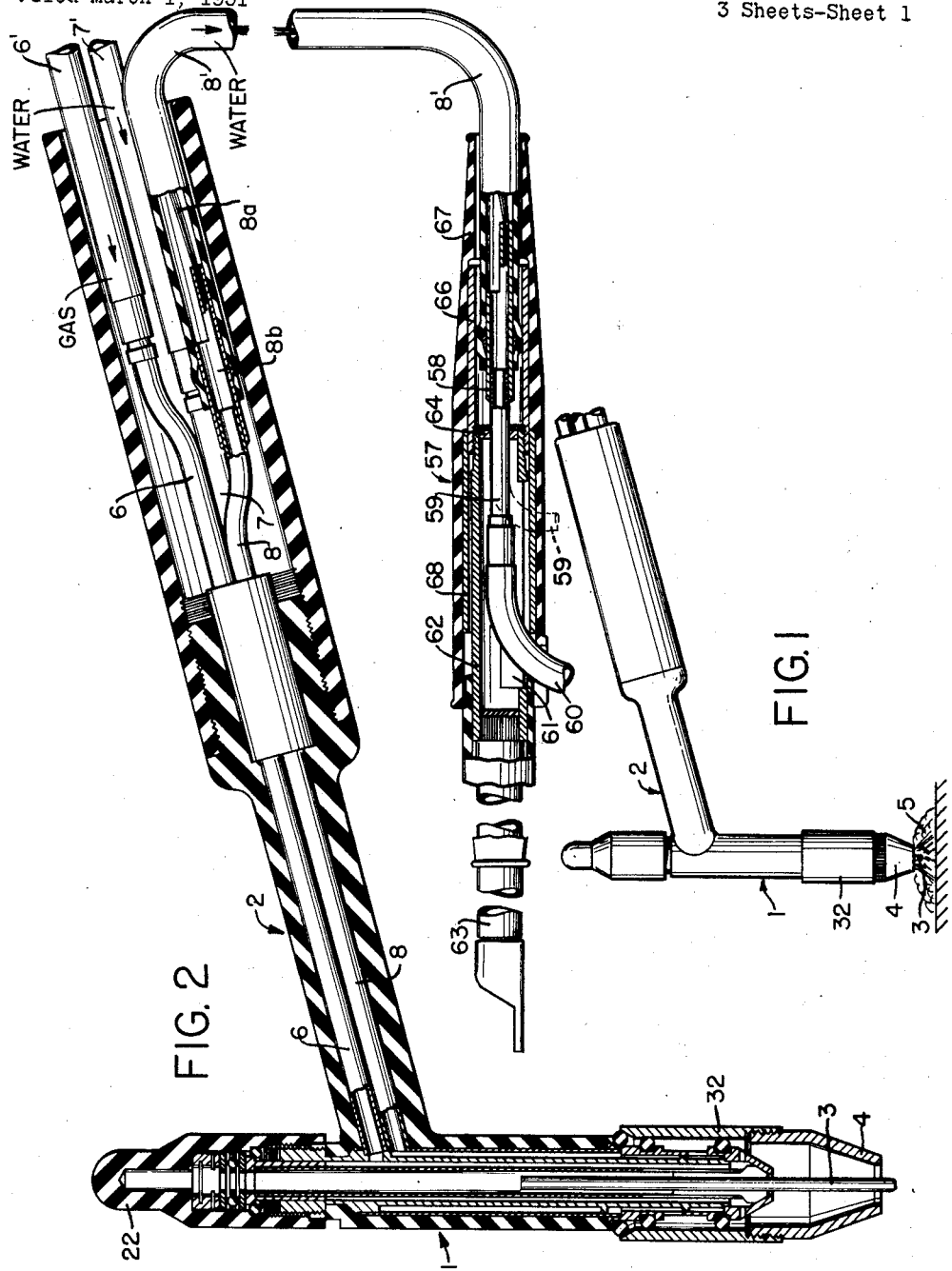
INVENTORS
NELSON E. ANDERSON
EDMUND T. SULLIVAN
BY
ATTORNEYS Nov. 17, 1953 N. E. ANDERSON ET AL 2,659,797
ARC WELDING APPARATUS Filed March 1, 1951 3 Sheets-Sheet 2

INVENTORS
NELSON E. ANDERSON
EDMUND T. SULLIVAN
BY
ATTORNEYS

Nov. 17, 1953     N. E. ANDERSON ET AL     2,659,797
ARC WELDING APPARATUS
Filed March 1, 1951
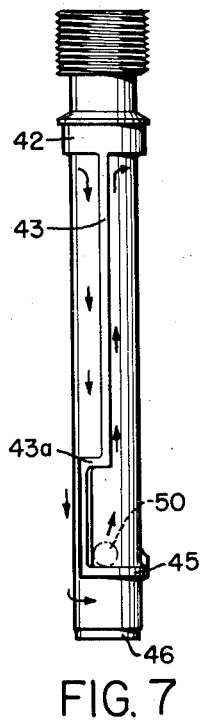
FIG. 7
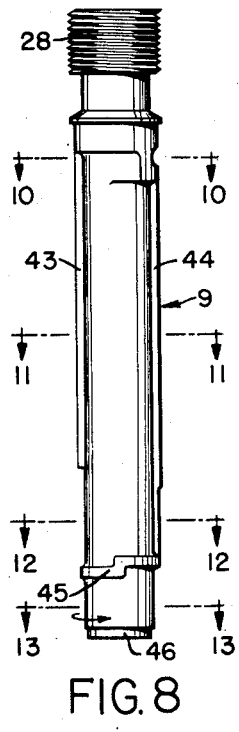
FIG. 8
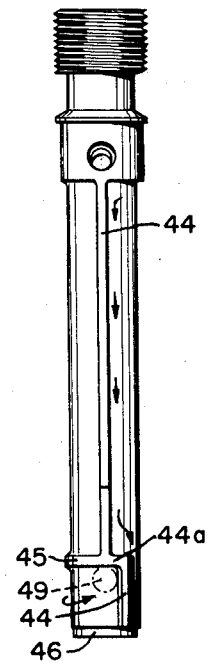
FIG. 9
FIG. 10     FIG. 11     FIG. 12
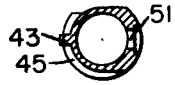     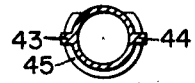     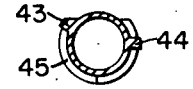
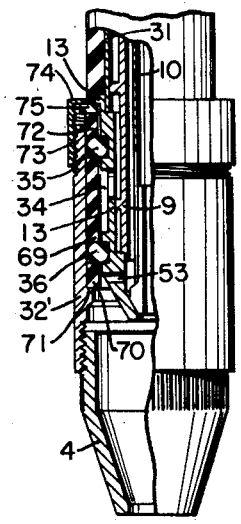
FIG. 14
FIG. 13
INVENTORS
NELSON E. ANDERSON
EDMUND T. SULLIVAN
BY
ATTORNEYS Patented Nov. 17, 1953

2,659,797

UNITED STATES PATENT OFFICE 2,659,797

ARC WELDING APPARATUS

Nelson E. Anderson, Berkeley Heights, and Edmund T. Sullivan, Laurence Harbor, N. J., assignors to Air Reduction Company, Incorporated, New York, N. Y., a corporation of New York Application March 1, 1951, Serial No. 213,446

13 Claims. (Cl. 219—8)

1

This invention relates to inert gas-shielded arc welding and more particularly to improved water-cooled gas-blanketed arc welding apparatus for use in that kind of welding.

As is well known in the arc welding art, the inert gas-shielded arc welding process is one in which an arc is struck between an electrode and the work-piece to produce the necessary welding heat, and an envelope of inert gas, usually helium or argon, is maintained around the arc and the weld puddle to prevent oxidation. Sometimes a depositing electrode of either the stick type or the wire type is employed and is automatically fed toward the work as it is consumed. At other times a non-consuming electrode usually made of tungsten is employed.

The invention pertains primarily to certain improvements in the manual water-cooled gas-blanketed electrode holder or welding torch disclosed and claimed in prior Patent No. 2,512,706, issued June 27, 1950, that torch being of the type which has a tungsten or other non-consuming electrode, but some of the present improvements are applicable to water-cooled gas-blanketed arc welding apparatus regardless of whether it is of the manual or automatic type and regardless of whether the electrode is of the consuming type or the non-consuming type.

A manual water-cooled gas-blanketed electrode holder or welding torch having a non-consuming electrode and embodying the invention is illustrated in the accompanying drawings, in which:

Figure 1 is a side elevation of the welding torch shown in welding relation to a work-piece, Fig. 2 is a vertical section of the welding torch of Fig. 1.

Fig. 3 is an enlarged vertical section of the barrel portion only of the welding torch shown in Fig. 2, Fig. 4 is a partial vertical section through those members of the welding torch which form the cooling water passages in the barrel portion of the torch, the section being taken on the line 4—4 of Fig. 5, Fig. 5 is a horizontal section taken on the line 5—5 of Fig. 4, Fig. 6 is a horizontal section taken on the line 6—6 of Fig. 4, Figs. 7, 8 and 9 are side elevations showing the body casting of the torch's barrel portion viewed from three directions, Fig. 10 is a horizontal section taken on the line 10—10 of Fig. 8, Fig. 11 is a horizontal section taken on the line 11—11 of Fig. 8,

2

Fig. 12 is a horizontal section taken on the line 12—12 of Fig. 8,

Fig. 13 is a horizontal section taken on the line 13—13 of Fig. 8, and

Fig. 14 is a side elevation, partly in vertical section, of a modified form of the lower or nozzle end of the welding torch.

Figure 3:
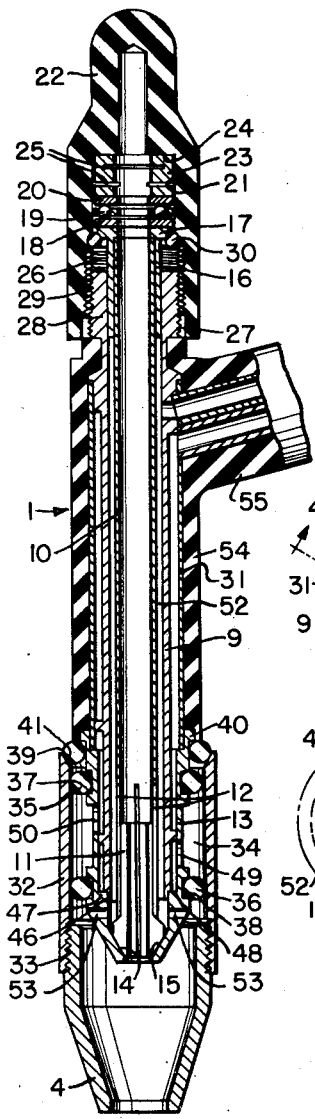

Referring first to Fig. 1, the welding torch illustrated in the drawings comprises a barrel portion 1, and a handle portion 2 connected to the barrel portion at an angle slightly greater than a right angle. An electrode of tungsten or the like is gripped within the barrel portion in the manner hereinafter described, the tip of the electrode appearing at 3. At the lower end of the barrel portion there is a nozzle 4 which discharges an inert shielding gas such as argon or helium in an annular stream which blankets the tip of the electrode, the arc, and the weld puddle, as represented at 5. The shielding gas is supplied to the barrel portion through a metal tube 6 (Fig. 2) which extends through the handle portion 2 and which delivers the gas to a passage in the barrel portion which in turn delivers the gas to the nozzle 4 all in the manner to be later described. The tube 6 is connected to a gas supply hose 6' (Figs. 1 and 2). Cooling water passages are formed in the barrel portion 1 in a manner also later described, the cooling water being delivered to and discharged from these passages by metal tubes 7 and 8 (Fig. 2) which pass through the handle portion and which connect respectively with a water delivery hose 7' and a water discharge hose 8' (Figs. 1 and 2).

The interior construction of the barrel portion of the welding torch is best illustrated in Fig. 3. As shown in this figure the barrel portion 1 comprises a tubular main casting or body casting 9 which is illustrated by itself in Figs. 7-13, inclusive. This casting may be made of brass or any other material which is a good electrical conductor. Extending through the interior of the tubular casting 9 is a central tube 10 which constitutes part of the electrode-gripping collet. This tube is preferably made of stainless steel. Brazed or otherwise secured in the lower end of the collet tube 10 is a tubular insert 11 made of copper. A number of longitudinally extending slots are cut completely through the copper insert and part way up into the collet tube 10 to thereby form a number of resilient collet jaws. There are preferably four of these slots cut 90° apart to form four of the resilient collet jaws. Three of the slots appear in Fig. 3 each being designated 12. Thus, the portions of the collet jaws which engage the electrode are made of copper which provides good electrical contact with the electrode, and good permanent resiliency is imparted to the collet jaws by the stainless steel of which the tube 10 is made. It has been found that if the collet jaws are made entirely of copper, the copper anneals after the welding torch has been used for some time thereby lessening the resiliency of the collet jaws.

A collet sleeve 13 made of copper or any other material that is a good thermal conductor, is fitted on the lower end of the tubular body casting 9. This collet sleeve has an internal conical surface 14 adapted to cooperate with correspondingly tapered surfaces 15 formed externally on the lower ends of the collet jaws. Thus, it will be seen that if the collet tube 10 is moved axially in a downward direction the conical surface 14 on the relatively stationary collet sleeve produces a cam action on the collet jaws which forces them inwardly into gripping engagement with the electrode, and when the collet tube 10 is moved axially in an upward direction the collet jaws release their grip in the electrode. The collet and collet sleeve therefore constitute an electrode-gripping chuck.

The upper end of the collet tube 10 has a close fit within a thrust sleeve 16 having a radially extending flange 17 at its upper end. The upper end of the thrust sleeve bears against the lower race member 18 of a ball-type thrust bearing 19, the upper race member of which is shown at 20. The ball bearing is contained within a cavity 21 in a collet-actuating cap 22 made of suitable plastic electric insulating material such as Bakelite. A shock absorber 23 is interposed between the upper race member 20 of the ball bearing and a shoulder 24 in the cap 22. This shock absorber may be given a compressible or yielding property in any suitable way. For instance, it may be a coil spring, but it is preferably a hollow cylinder of stainless steel which has slots 25 cut partially through it in a direction at right angles to its axis and so arranged as to cause it to act as a spring.

The central cavity in the cap 22 is enlarged in diameter at its lower end as shown at 26 and is internally threaded to have threaded engagement with external threads 27 formed on an enlarged head 28 at the upper end of the body casting 9. Instead of causing the internal threads on the cap to directly engage the external threads on the head there is preferably interposed between them a so-called helicoil 29 which fits in the internal threads in the cap 22 and itself forms threads which engage with the external threads on the casing head 28. This provides a stronger thread and prevents wear of the threads on the plastic cap 22.

An O-ring 30 is retained in the cap 22 at the upper end of the enlarged portion 26 of its central cavity. This O-ring engages the lower corner of the flange 17 on the thrust sleeve 16 and thus retains the entire collet in assembled relation with the cap 22. In positioning the collet in the barrel portion of the torch, the collet is first positioned in the cap 22 before the cap is screwed in place on the head 28 of the body casting 9. This may be done simply by forcing the collet into the cap 22 until the flange 17 on the thrust sleeve 16 snaps past the O-ring. The O-ring then yieldingly holds the collet in assembled relation with the cap. The collet is then inserted in the tubular body casting 9 and the cap 22 is screwed on the threaded head 28 thereof. The collet may be removed, and replaced by one adapted to grip a larger or smaller electrode, merely by removing the cap 22 and then canting or cocking the collet slightly to one side while giving the collet a slight pull until the flange 17 slips through the O-ring 30. The O-ring prevents the thrust sleeve 16 and the shock absorbing member 23 from falling out of the cap when the cap is removed from the welding torch and the collet is removed from the cap. An electrode is inserted into the collet through the nozzle 4 and then the cap 22 is turned in a direction to move downwardly. The cap is permitted to rotate freely without imparting any rotation to the collet due to the provision of a ball bearing 19 but the axial downward movement of the cap moves the collet downwardly and causes the collet jaws to grip the electrode, as previously explained. To remove the electrode the cap 22 is turned in the opposite direction to permit the resilient collet jaws to spring apart sufficiently to release the electrode. The ball bearing 19 eliminates the transmission of any torque to the collet when the cap 22 is turned and thereby prevents scratching or scoring of any part of the collet or twisting of the collet jaws. The shock absorbing member 23 equalizes the difference in thermal expansion between the collet and other parts of the welding torch. It prevents the development of forces which would damage the collet jaws and cooperating parts when either the collet or the other parts with which it is associated are brought up to operating temperature.

The upper end of the collet sleeve 13 is brazed or otherwise secured to the lower end of a tube 31 that surrounds a portion of the tubular body casting 9. This tube is preferably made of brass. As hereinafter described the tubular body casting 9 is so shaped that it forms with the tube 31 and the collet sleeve 13 water passages that allow for a circulation of cooling water through the barrel portion of the welding torch. Surrounding the collet sleeve 13 is a sleeve 32 preferably made of copper which constitutes a nozzle holder. The upper end of the gas nozzle 4, also preferably made of copper, screws into the lower end of the nozzle holder 32 as shown at 33. The internal diameter of the nozzle holder 32 is greater than the external diameter of the collet sleeve 13 to form an annular water chamber 34. A pair of axially spaced O-rings 35 and 36 are retained on the collet sleeve 13 in annular grooves 37 and 38 respectively. The nozzle holder is positioned by forcing it over the O-rings 35 and 36, these rings being of such a size relative to the internal diameter of the nozzle holder that they permit this and yet frictionally retain the nozzle holder in its assembled position at the lower end of the barrel portion of the torch. The two O-rings 35 and 36 define the upper and lower limits of the water chamber 34. A third O-ring 39 surrounds the upper end of the collet sleeve 13 under a shoulder 40 thereon. This O-ring acts as a stop to limit the upward movement of the nozzle holder when it is forced over the O-rings 35 and 36 in assembling it on the torch. The upper inner corner of the sleeve or nozzle holder 32 is preferably beveled as shown at 41 to form a tapered seat which bears against the O-ring 39 and prevents upward movement of the sleeve beyond this O-ring, and facilitates installation of adapter over the O-rings 35 and 36. To remove the nozzle holder 32 it is only necessary to pull on it with sufficient force to cause it to slide off of the O-rings 35 and 36.

The shape of the tubular body casting 9 is best shown in Figs. 7–13, inclusive. It has, in addition to the above-described externally threaded head portion 28, a smooth cylindrical portion 42 having the same external diameter as the internal diameter of the above-described outer tube 31. The upper end of this tube fits snugly on this smooth portion 42 of the body casting. That part of the body casting below the portion 42 is of smaller diameter and has two diametrically opposite longitudinal ribs 43 and 44 which extend downwardly from the portion 42. The rib 43, as shown in Fig. 7, extends down to a circumferential rib 45 spaced a short distance above the lower end of the casting 9. The circumferential rib 45 extends around one side of the body casting until it joins the other longitudinal rib 44 and this longitudinal rib extends downwardly below the circumferential rib 45 as best shown in Fig. 9.

The outer tube 31 has a water-tight fit over the ribs on the upper portion of the body casting 9, and the collet sleeve 13 has a water-tight fit over the ribs on the lower portion of the body casting. Thus, the ribbed body casting together with the tube 31 and the collet sleeve 13 form water circulating passages through which the water flows in a manner soon to be described. The extreme lower end of the body casting 9 is slightly reduced in diameter as shown at 46 (Figs. 7–9). This portion of the body casting fits within a portion 47 (Fig. 3) of the collet sleeve that has a smaller internal diameter than the portion of the collet sleeve that fits over the ribs on the body casting. The shoulder 48 existing on the collet sleeve at the place where there is a change in the internal diameter of the collet sleeve forms the lower wall of the water circulating passages beyond which the water cannot flow.

Figure 4:
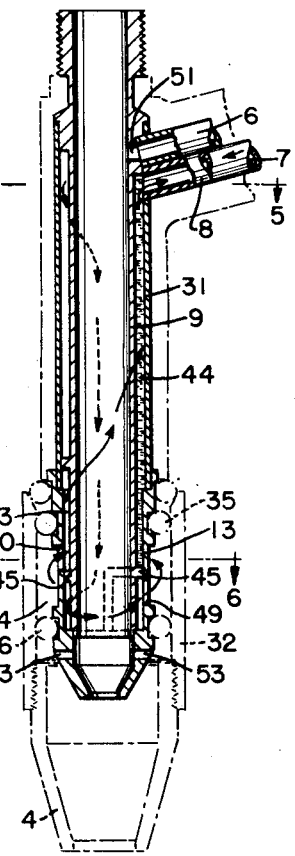

The collet sleeve 13 has two diametrically opposite ports 49 and 50 (Fig. 4). When the collet sleeve is assembled on the lower end of the body casting 9 the port 49 lies just below the circumferential rib 45 on the body casting. The port 50 is at a higher location on the collet sleeve 13 so that it lies just above the circumferential rib 45. Thus, the port 49 communicates with the space below the rib 45 in Figs. 7, 8 and 9 and with the space at the left of rib 43 in Fig. 7 and at the right of the rib 44 in Fig. 9, while the port 50 communicates with the space above the rib 45 in Figs. 7, 8 and 9 and with the space at the right of rib 43 in Fig. 7 and at the left of rib 44 in Fig. 9. In order to enable the ports 49 and 50 to communicate with the proper spaces formed by the ribs on the body casting 9 and at the same time be positioned diametrically opposite on the collet sleeve 13, the longitudinal rib 43 on the body casting 9 has a jog or offset 43a as shown in Fig. 7, and the longitudinal rib 44 on the body casting has a jog or offset 44a as shown in Fig. 9. In the assembled welding torch the ports 49 and 50 in the collet sleeve will then occupy the positions relative to the ribs on the body casting and relative to the spaces formed by them indicated by the broken lines in Figs. 7 and 9.

Figure 5:
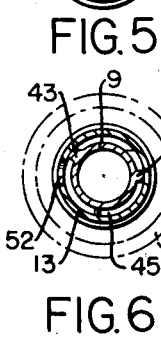
Figure 6:

Figs. 4–6 show only the parts of the barrel portion which form the water circulating passages and these views, in conjunction with Figs. 7–13 showing the ribs on the body casting, make clear the manner in which the cooling water is caused to flow through the barrel portion. Water enters the tube 31 of the barrel portion from the water delivery tube 7 and flows into the space at the rear side of the longitudinal ribs 43 and 44 on the body casting (Fig. 5). It then flows downwardly to the lower end of the body casting and then circumferentially around the lower end of the body casting under the circumferential rib 45. Its circumferential flow under the rib 45 is limited by the lower end of longitudinal rib 44 so that water cannot completely encircle the body casting and again reach the water passage through which it flowed down along the body casting. However, after the water has flowed circumferentially around the lower end of the body casting and has reached the lower end of longitudinal rib 44 it passes outwardly through the port 49 in the collet sleeve 13 (Fig. 4) into the above-described annular water chamber 34 between the collet sleeve and the nozzle holder 32. It flows circumferentially in both directions through this annular chamber from port 49 in the collet sleeve to port 50 therein and then inwardly through port 50 into the water passage above the circumferential rib 45 on the casting 9 and at the forward side of the longitudinal ribs 43 and 44 thereon (Fig. 5). As shown in Fig. 5 the water discharge tube 8 communicates with this passage and therefore the water flows upwardly through such passage and out through the tube 8. The path followed by the water during its circulation through the barrel portion of the torch is indicated by the arrows in Figs. 4 and 5 and in Figs. 7, 8 and 9. It should be noted that all portions of the stream of water may be said to be in series relationship, i. e., there are substantially no pockets in which the water can stagnate or flow less rapidly than the main stream of water, and there are no water paths in parallel relation with the main path in which the water might tend to stagnate or flow with less speed than the main water stream. Therefore, the water stream efficiently and effectively absorbs heat from all portions of the torch in contact with which it flows. The circulating water comes in direct contact with the body casting 9 and the collet sleeve 13 thereby directly cooling them, and the collet sleeve absorbs heat from the collet jaws and the collet tube 10. The circulating water also comes in direct contact with the nozzle holder 32 and thereby cools this member and the gas nozzle 4 connected to it.

The O-rings 35 and 36 not only serve to frictionally retain the nozzle holder 32 in position as above described but they also serves as water seals preventing the escape of water from the upper and lower portions of the annular water chamber 34 between the collet sleeve and the nozzle holder. The O-rings may also act as a fuse. If the operating temperature becomes too high the O-rings melt or soften thus causing water to leak from the annular water chamber 34 and giving a visual signal that the operating temperature is excessive. The O-rings further act as insulators to insulate the nozzle holder and the nozzle from the electrically conductive parts of the barrel portion of the torch so that no arc can be drawn from the nozzle.

The shielding gas entering through the tube 6 passes through a port 51 (Figs. 4 and 10) in the side wall of the body casting 9 and then passes downwardly through the space 52 between the body casting and the collet tube 10 (Fig. 3). When the gas reaches the lower end of the collet and the collet sleeve it passes through radial openings 53 in the collet sleeve into the interior of the gas nozzle 4 from which it is discharged around the tip of the electrode as above described.

The outer metal tube 31 of the barrel portion of the torch, and the upper end of the body casting up to the threaded head 28 thereon, are enclosed within a sleeve 54 of electric insulating material (Fig. 3). This sleeve has a portion 55 molded in one piece with it and which projects from it at an angle to form, along with an insulating extension sleeve 56 screwed to it (Fig. 2), the handle portion of the torch through which the gas and water tubes pass.

Welding current is supplied to the electrode through the metal parts in the barrel portion of the welding torch and through the three metal tubes which extend through the handle portion and which are all in electrical contact as hereinafter described. The water discharge hose 8' contains a stranded metal cable 8a (Fig. 2) which conducts the welding current to a short length of metal tubing 8b which projects out of the end of the hose 8' and to which the cable is connected. The tubing 8b is soldered to the water discharge tube 8 and therefore the welding current is conducted to this tube. The water discharge hose 8' and the cable therein lead to a so-called connector 57 (Fig. 2). In the connector, a short piece of metal tubing 58, which projects out of the hose 8' and which is connected to the cable therein, is soldered to another piece of metal tubing 59 to which a flexible hose 60 is connected. The hose 60 leaves the connector through a slot 61 in the side wall of a metal tube 62. An insulated welding cable 63 leads to the connector 57 and a bare end thereof is inserted into the outer end of the metal tube 62 and soldered or brazed therein. The forward end of the tube 62 has inserted in it a metal bushing 64 which holds the metal tube 59 in a central position relative to the metal tube 62. Thus, welding current passes from the cable 63 to the metal sleeve 62 then through the bushing 64 to the metal tubes 59 and 58 and thence through the metal cable in the water discharge hose 8' to the metal water discharge tube 8. In the handle portion of the torch the three metal tubes 6, 7 and 8 pass through a metal connector block 65 so from this connector block to the barrel portion of the torch the welding current passes through all three metal tubes. Since each of the metal tubes is in metal to metal contact either with the body casting 9 in the barrel portion or the outer metal tube 31 thereof, the welding current is conducted to these parts and by them to the collet sleeve 13 and the collet jaws and electrode. The water that is being discharged through the hose 8' leaves the connector 57 through the flexible hose 60. Thus, the water leaving the welding torch cools the welding conductor at least as far as the connector 57 at which point it leaves the welding conductor and flows to a suitable discharge point through the flexible hose 60. This cooling of the welding conductor by the water leaving the welding torch permits the use of light, easy-to-handle cable and welding torch. The welding operation is not begun until the cooling water has been turned on and checked for adequate supply.

The end of the metal tube 62 of the connector 57 nearest the welding torch has threaded connection with a metal tube 66 which fits tightly in an insulating sleeve 67. A metal tube 68 is brazed or soldered to the outer end of the tube 66 and normally telescopes over the tube 62 and covers most of the slot 61 in this tube. The insulating sleeve 67 extends over the tube 68 as shown. To connect the water discharge hose 60 to the metal tubing 59 the insulating sleeve 67 is slid along the water discharge hose 8' far enough to cause the tube 68 to uncover the slot 61 in the tube 62, and metal tube 66 is then unscrewed. The metal tube 59 can then be bent out of the slot 61 to the dotted-line position to enable the discharge hose 60 to be connected to it whereupon it is bent back to the full-line position. When the tubes 66 and 62 are again screwed together the tube 68 will cover the slot 61 except at the place where the hose 66 passes through it, and all of the metal parts will be covered by the insulating sleeve 67. It will be understood that the tube 66 and the inner end portion of the insulating sleeve 67 are large enough in internal diameter to permit them to slide freely on the water discharge hose 8' when the parts of the connector are coupled and uncoupled as just described.

Fig. 14 illustrates a modified form of nozzle holder and a modified way of holding it in place on the collet sleeve. When the welding torch is constructed as above described whenever the nozzle holder and nozzle are grounded (which is the case when the welding operator lays the welding torch on the work) a small current passes through the water in the cooling chamber 34 (Fig. 3) and electrolytically acts on the inner surface of the nozzle holder. This reduces the effectiveness of the O-rings 35 and 36 as water seals and leakage of water past them is likely to occur. It can also reduce the effectiveness of the O-rings as retaining rings for frictionally holding the nozzle holder in its proper position. To overcome this, the modified form of nozzle holder 32' shown in Fig. 14 has an insert or sleeve 69 made of electric insulating material positioned in the cooling water chamber 34 between the two O-rings 35 and 36. A similar but shorter sleeve of insulating material 70 is positioned below the lower O-ring 36 and rests at its lower face against a shoulder 71 formed on the inner wall of the nozzle holder 32', and a third sleeve of insulating material 72 is positioned above the upper O-ring 35. A clamping nut 73 has threaded engagement with the upper end of the nozzle holder 32' and is provided with an inwardly extending flange 74 which, through a washer 75 of insulating material, bears against the upper face of the insulating sleeve 72 when the nut is screwed down on the nozzle holder. The nozzle holder slides freely over the O-rings 35 and 36 when it is positioned but by tightening the nut 73 the O-rings are compressed between the insulating sleeves in a direction substantially parallel to the axis of the nozzle holder and this expands the O-rings in a radial direction until they produce a firm frictional grip on the nozzle holder. With this construction, when the inner surface of the nozzle holder is electrolytically affected as above described further tightening of the nut 73 compresses the O-rings 35 and 36 still further until their effectiveness as water seals and retaining rings is completely restored. When high frequency current is utilized to start the arc and/or stabilize the arc, it is desirable to make the insulating sleeve 70 somewhat longer than shown in Fig. 14 to increase the width of the gap between the shoulder 71 on the nozzle holder and the lower end of the collet sleeve 13 because gas from the port 53 flows through this gap and may be ionized by the high frequency current thus producing a discharge across the gap if the gap is too small. The nut 73 should then be made longer than shown and preferably made of insulating material to prevent high frequency discharge between it and the collet sleeve 13.

Referring again to Fig. 3, the tubular body casting 9 together with the collet sleeve 13, and with or without the outer tube 31, may be regarded as a tubular structure whose lower end the nozzle-holding sleeve 32 surrounds. The collet sleeve 13 together with the tube 31 may be regarded as a sleeve structure which surrounds the body casting or tubular member 9.

We claim:

1. Arc welding apparatus comprising a tubular structure, means for retaining an electrode in coaxial relation with said tubular structure with the end of the electrode projecting out of the lower end thereof, a nozzle-holding sleeve surrounding the lower end of said tubular structure and forming therewith an annular water chamber, a gas nozzle carried by said nozzle-holding sleeve and into which the electrode projects from said tubular structure, a pair of O-rings spaced apart axially of the nozzle-holding sleeve and each positioned between it and the tubular structure, the O-rings serving as water seals at the upper and lower ends of said annular water chamber and serving to frictionally hold the nozzle-holding sleeve on said tubular structure, a third O-ring located at the upper end of the nozzle-holding sleeve, the tubular structure having an external shoulder and the nozzle-holding sleeve having an internal conical surface between which and said shoulder the third O-ring is positioned to thereby prevent upward movement of the nozzle-holding sleeve beyond such O-ring, and means for supplying water to and discharging it from said annular water chamber for circulation therein.

2. Arc welding apparatus comprising a tubular member, means for retaining an electrode in coaxial relation with said member with the end of the electrode projecting out of the lower end thereof, a sleeve structure surrounding said tubular member, a nozzle-holding sleeve surrounding said sleeve structure and forming therewith an annular water chamber, a gas nozzle carried by said nozzle-holding sleeve and into which the electrode projects from said tubular member, means forming a water seal at each of the upper and lower ends of said annular water chamber, said sleeve structure having a pair of diametrically opposite ports extending through its wall, and means forming with said ports and tubular member and sleeve structure a path for cooling water which starts near the top of the tubular member and extends down along one side of it between it and the sleeve structure substantially to the lower end of the tubular member, then circumferentially in one direction only substantially completely around the lower end of the tubular member, then out one of said ports in the sleeve structure into said annular chamber and around said chamber to said other port in the sleeve structure, then inwardly through such port, and thence up along the other side of the tubular member between it and the sleeve structure to the end of the path near the upper end of the tubular member.

3. Arc welding apparatus comprising a tubular member, an electrode-gripping chuck for holding an electrode in coaxial relation with said member, a sleeve structure surrounding said tubular member a part of which forms part of said chuck, a nozzle-holding sleeve surrounding said sleeve structure and forming therewith an annular water chamber, a gas nozzle carried by said nozzle-holding sleeve and into which an electrode when gripped by the chuck projects from said tubular member, means forming a water seal at each of the upper and lower ends of said annular water chamber, said sleeve structure having a pair of diametrically opposite ports extending through its wall, and means forming with said ports and tubular member and sleeve structure a path for cooling water which starts near the top of the tubular member and extends down along one side of it between it and the sleeve structure substantially to the lower end of the tubular member, then circumferentially in one direction only substantially completely around the lower end of the tubular member, then out one of said ports in the sleeve structure into said annular chamber and around said chamber to said other port in the sleeve structure, then inwardly through such port, and thence up along the other side of the tubular member between it and the sleeve structure to a point near the upper end of the tubular member.

4. Arc welding apparatus comprising a tubular member, means for retaining an electrode in coaxial relation with said member with the end of the electrode projecting out of the lower end thereof, a sleeve structure surrounding said tubular member, a nozzle-holding sleeve surrounding said sleeve structure and forming therewith an annular water chamber, a gas nozzle carried by said nozzle-holding sleeve and into which the electrode projects from said tubular member, means forming a water seal at each of the upper and lower ends of said annular water chamber, said tubular member having a pair of substantially diametrically opposite longitudinal ribs and a circumferential rib located a short distance above the lower end of the tubular member and extending around one side only of the tubular member and joining the longitudinal ribs, the first of said longitudinal ribs extending below said circumferential rib and the second terminating at it, said ribs thus defining with said sleeve structure (1) a first water passage along one side of the tubular member, (2) a second or circumferential water passage below said circumferential rib that is in communication with the first passage and that extends substantially completely around the lower end of the tubular member until it is terminated by the portion of the first longitudinal rib that extends below the circumferential rib, and (3) a third water passage along the opposite side of the tubular member which is closed at its lower end by said circumferential rib, said sleeve structure having a pair of diametrically opposite ports one of which places said second or circumferential passage near its terminal end in communication with said annular water chamber and the other of which places the annular water chamber in communication with said third water passage above said circumferential rib, a pair of water conduits one of which communicates with the upper end of said first water passage and the other of which communicates with the upper end of the third water passage whereby water introduced through one of said conduits may be caused to flow down through the first passage, then circumferentially in one direction only substantially completely around the lower end of the tubular member through said second or circumferential passage, then out one of said ports into said annular chamber and around said chamber to said other port, then inwardly through such port into the third water passage, and thence up through it to the other water conduit.

5. Arc welding apparatus comprising a tubular member, an electrode-gripping chuck for holding an electrode in coaxial relation with said member, a sleeve structure surrounding said tubular member a part of which forms part of said chuck, a nozzle-holding sleeve surrounding said sleeve structure and forming therewith an annular water chamber, a gas nozzle carried by said nozzle-holding sleeve and into which an electrode when gripped by the chuck projects from said tubular member, means forming a water seal at each of the upper and lower ends of said annular water chamber, said tubular member having a pair of substantially diametrically opposite longitudinal ribs and a circumferential rib located a short distance above the lower end of the tubular member and extending around one side only of the tubular member and joining the longitudinal ribs, the first of said longitudinal ribs extending below said circumferential rib and the second terminating at it, said ribs thus defining with said sleeve structure (1) a first water passage along one side of the tubular member, (2) a second or circumferential water passage below said circumferential rib that is in communication with the first passage and that extends substantially completely around the lower end of the tubular member until it is terminated by the portion of the first longitudinal rib that extends below the circumferential rib, and (3) a third water passage along the opposite side of the tubular member which is closed at its lower end by said circumferential rib, said sleeve structure having a pair of diametrically opposite ports one of which places said second or circumferential passage near its terminal end in communication with said annular water chamber and the other of which places the annular water chamber in communication with said third water passage above said circumferential rib, a pair of water conduits one of which communicates with the upper end of said first water passage and the other of which communicates with the upper end of the third water passage whereby water introduced through one of said conduits may be caused to flow down through the first passage, then circumferentially in one direction only substantially completely around the lower end of the tubular member through said second or circumferential passage, then out one of said ports into said annular chamber and around said chamber to said other port, then inwardly through such port into the third water passage, and thence up through it to the other water conduit.

6. An electrode holder comprising a barrel portion including a tubular structure having an inwardly and downwardly tapering surface near its lower end, a collet within said tubular structure and capable of axial movement relative thereto, said collet having an axial opening to receive the electrode and having resilient electrode-gripping jaws and also having a conical surface formed on the collet jaws adapted to engage said tapering surface on the tubular structure, and collet-actuating means for moving said collet axially to cause said tapering surface on the tubular structure to produce a cam action on the collet jaws and cause them to grip an electrode when one is inserted in the collet, said means comprising a member having threaded engagement with the upper end of said tubular structure and arranged to exert axial force on the upper end of the collet when such member is screwed down on the tubular structure and a ball bearing interposed between the upper end of the collet and the portion of said threaded member that produces the axial force on the collet, whereby said member may be manually and freely rotated relative to the collet but will produce axial movement of the collet and gripping of the electrode.

7. An electrode holder comprising a barrel portion including a tubular structure having an inwardly and downwardly tapering surface near its lower end, a collet within said tubular structure and capable of axial movement relative thereto, said collet having an axial opening to receive the electrode and having resilient electrode-gripping jaws and also having a conical surface formed on the collet jaws adapted to engage said tapering surface on the tubular structure, and collet-actuating means for moving said collet axially to cause said tapering surface on the tubular structure to produce a cam action on the collet jaws and cause them to grip an electrode when one is inserted in the collet, said means comprising a member having threaded engagement with the upper end of said tubular structure and arranged to exert only axial force on the upper end of the collet when such member is screwed down on the tubular structure, and a yielding member interposed between the upper end of the collet and the portion of said threaded member that produces the axial force on the collet through which the axial force is transmitted by said member to the collet.

8. An electrode holder comprising a barrel portion including a tubular structure having an inwardly and downwardly tapering surface near its lower end, a collet within said tubular structure and capable of axial movement relative thereto, said collet having an axial opening to receive the electrode and having resilient electrode-gripping jaws and also having a conical surface formed on the collet jaws adapted to engage said tapering surface on the tubular structure, and collet-actuating means for moving said collet axially to cause said tapering surface on the tubular structure to produce a cam action on the collet jaws and cause them to grip an electrode when one is inserted in the collet, said collet-actuating means comprising a cap having threaded engagement with the upper end of the tubular structure, and a ball bearing and a yielding member interposed between the upper end of the collet and the portion of the cap that produces the axial force on the collet and through both of which the axial force is transmitted by the cap to the collet.

9. Arc welding apparatus comprising a barrel portion including a tubular structure having an inwardly and downwardly tapering surface near its lower end, a collet tube located within said tubular structure and having an axial opening to receive an electrode and having resilient electrode-gripping jaws at its lower end, the electrode-gripping jaws having a conical surface adapted to engage said tapering surface on the tubular structure, the collet tube being axially movable relative to the tubular structure to cause said tapering surface on the tubular structure to produce a cam action on the electrode-gripping jaws to cause them to grip an electrode when one is inserted in the collet, a collet-actuating cap having threaded engagement with the upper end of said tubular structure and into which the upper end of the collet tube projects, the upper end of the collet tube being provided with a radial flange, and an O-ring within said cap which engages said flange to yieldingly retain the collet tube in the cap when the cap is entirely removed from the upper end of the tubular structure, the cap serving when screwed down on the tubular structure to produce only axial movement of the collet tube.

10. An electrode holder comprising a barrel portion including a tubular structure, an electrode-gripping chuck for holding an electrode in coaxial relation with said tubular structure, said chuck comprising an axially movable collet extending through the tubular structure for the full length of the barrel portion and having resilient electrode-gripping jaws, the chuck further comprising a stationary part associated with the tubular structure cooperating with the resilient collet jaws to force them inwardly into gripping engagement with an electrode when the collet is moved axially, a collet-actuating cap having threaded engagement with the upper end of said tubular structure and into which the upper end of the collet projects, the upper end of the collet being provided with a radial flange, and an O-ring within said cap which engages said flange to yieldingly retain the collet in the cap when the cap is entirely removed from the upper end of the tubular structure, the cap serving when screwed down on the tubular structure to produce only axial movement of the collet.

11. An electrode holder in accordance with claim 10 having a ball bearing and a yielding member positioned within said collet-actuating cap and through which the axial movement is imparted to the collet when the cap is screwed down on the tubular structure, said O-ring serving to retain the ball bearing and the yielding member within the cap when the collet is removed from the cap by pulling it until the flange on the collet slips through the central opening of the O-ring.

12. Arc welding apparatus comprising an electrically conductive tubular structure, an electrode-gripping chuck for holding an electrode in coaxial relation with said tubular structure, a portion of said tubular structure constituting a part of said chuck, a nozzle-holding sleeve surrounding the lower end of said tubular structure and forming therewith an annular water chamber, a gas nozzle carried by said nozzle-holding sleeve and into which an electrode when gripped by the chuck projects from said tubular structure, a pair of O-rings spaced apart axially of the nozzle-holding sleeve and each positioned between it and the tubular structure so that each makes direct contact with both of them, the nozzle-holding sleeve having an internal shoulder below the lower O-ring, an insulating sleeve positioned between said shoulder and the lower O-ring, an insulating sleeve positioned between the two O-rings, an insulating sleeve positioned above the upper O-ring, a clamping nut having threaded engagement with the upper end of the nozzle-holding sleeve and having a portion which exerts axial pressure on the uppermost insulating sleeve when the nut is screwed down on the nozzle-holding sleeve to thereby axially compress the O-rings between the insulating sleeves and expand them radially against the inner surface of the nozzle-holding sleeve and the outer surface of the tubular structure, and means for supplying water to and discharging it from said annular chamber for circulation therein.

13. An arc welding torch particularly adapted for use with high-frequency arc starting or arc stabilizing current comprising a barrel portion including an electically conductive tubular structure, an electrode-gripping chuck for holding an electrode in coaxial relation with said tubular structure, a portion of said tubular structure constituting a part of said chuck, a nozzle-holding sleeve surrounding the lower end of said tubular structure and forming therewith an annular water chamber, a gas nozzle carried by said nozzle-holding sleeve and into which an electrode when gripped by the chuck projects from said tubular structure, a pair of O-rings spaced apart axially of the nozzle-holding sleeve and each positioned between it and the tubular structure so that each makes direct contact with both of them, the nozzle-holding sleeve having an internal shoulder below the lower O-ring, an insulating sleeve positioned between said shoulder and the lower O-ring, an insulating sleeve positioned between the two O-rings, an insulating sleeve positioned above the upper O-ring, a clamping nut having threaded engagement with the upper end of the nozzle-holding sleeve and having a portion which exerts axial pressure on the uppermost insulating sleeve when the nut is screwed down on the nozzle-holding sleeve to thereby axially compress the O-rings between the insulating sleeves and expand them radially against the inner surface of the nozzle-holding sleeve and the outer surface of the tubular structure, and means for supplying water to and discharging it from said annular chamber for circulation therein, said means including a water delivery passage which extends from a point near the upper end of said tubular structure down along the tubular structure to the annular water chamber and a water discharge passage which extends from the annular water chamber up along the tubular structure to a point near the upper end thereof.

NELSON E. ANDERSON.
EDMUND T. SULLIVAN.

References Cited in the file of this patent

UNITED STATES PATENTS

| Number | Name | Date |
|---|---|---|
| 2,434,343 | Barkelew | Jan. 13, 1948 |
| 2,512,706 | Anderson | June 27, 1950 |
| 2,512,707 | Anderson | June 27, 1950 |
| 2,527,235 | Tuthill | Oct. 24, 1950 |